United States Patent [19]

Lange

[11] 4,232,936
[45] Nov. 11, 1980

[54] PIVOT-JOINT CONSTRUCTION FOR BINOCULAR TELESCOPE

[75] Inventor: Karl-Heinz Lange, Bünde, Fed. Rep. of Germany

[73] Assignee: Balda-Werke Photographische Gerate und Kunststoff GmbH & Co. KG, Bünde, Fed. Rep. of Germany

[21] Appl. No.: 8,446

[22] Filed: Feb. 1, 1979

[30] Foreign Application Priority Data

Feb. 1, 1978 [DE] Fed. Rep. of Germany ....... 2804174

[51] Int. Cl.$^3$ .............................................. G02B 7/12
[52] U.S. Cl. ..................................................... 350/75
[58] Field of Search .................................... 350/75, 76

[56] References Cited

U.S. PATENT DOCUMENTS

| 3,298,770 | 1/1967 | Rosendahl | 350/75 X |
| 3,431,043 | 3/1969 | Cassidy et al. | 350/75 |
| 3,604,779 | 9/1971 | Reinhold | 350/75 |

Primary Examiner—John K. Corbin
Assistant Examiner—Matthew W. Koren
Attorney, Agent, or Firm—Blum, Kaplan, Friedman, Silberman & Beran

[57] ABSTRACT

A pivot-joint construction for a binocular telescope wherein each telescope tube is pivotable for adjusting the interocular distance between the tubes is provided. Required friction between hinged telescope tube and connection bridge elements is provided by hinge friction tabs stressed in the direction of the axis of the hinge. The tube and the bridge include at least two outer pairs of cooperating non-tensioned hinge tabs having axial holes therein for retaining a hinge pin. A pre-stressed spring is disposed on a central hinge tab of one element about the pin between cooperating tabs on the other element for stressing in the axial direction so that the interocular distance of the telescope will remain set without disturbing the required parallelism between the telescope tubes. The construction is particularly well suited for binocular telescopes fabricated from synthetic materials.

8 Claims, 2 Drawing Figures

PIVOT-JOINT CONSTRUCTION FOR BINOCULAR TELESCOPE

BACKGROUND OF THE INVENTION

This invention relates generally to a binocular telescope, and in particular to a pivot-joint construction for a binocular telescope having a collapsible bridge between parallel telescope tubes. In most conventional binocular telescopes or field glasses, either the connecting bridge and the two eyepiece tubes, or at least the connecting bridge, are fabricated from metal. Heretofore, it has not been possible to manufacture a satisfactory binocular telescope entirely from synthetic material. This was due in part to the fact that it was not possible to satisfy the stringent requirements of precision, especially the requirement of parallelism between the axes of the eyepieces when using parts fabricated from synthetic material. Application of known constructions utilized in telescopes fabricated from metallic material did not produce satisfactory results with telescopes fabricated from synthetic material. This has been especially true in connection with double-hinged binocular telescope constructions.

In a conventional pivot-joint construction described in German Patent No. DT-GM-7 247 999 the two adjustable tubes for adjusting the interocular distance between eyepieces are assembled in adjustable form on a connecting bridge. In this construction the required friction between the hinged elements is produced by means of tension elements pre-stressed along the axial direction of the hinge. The necessary friction is produced in the direction of the hinge shaft on two storage holes which are compressed by the metal bridge. The pre-stressing in these conventional constructions occurs by means of a headless screw that is rotatable along the axis of the hinge on which lower part there is assembled a pressure or thrust body with a central receptacle for a ball thrust. This thrust body, like the headless screw, is located in the blind storage hole of the hinge tube. A cone-shaped catch opening is formed in the metal bridge opposite the thrust body. The required friction is insured by adjusting the headless screw which can be tightened or loosened, thereby resulting in a greater or a lesser pressure on the ball in the receptacle. It is questionable whether the required forces can be exerted without causing deformation of the connecting bridge even when the main elements are fabricated from metal. Such deformation has a negative influence on the parallelism of the axes of the eyepieces. Thus, such a construction is wholly unsuitable for use in telescopes wherein the main elements, namely the telescope tubes and the connecting bridge, are fabricated from synthetic materials.

Accordingly, use of such known constructions in a binocular telescope formed from synthetic material would surely lead to deformation of the connecting bridge and/or the storage holes provided in the hinge tabs on the tubes. Such a telescope would not provide a sharp image because of a lack of axes parallelism in the beam paths. Thus, it is desirable to depart from the conventional state of technology relating to metal telescopes and provide a pivot-joint construction for a binocular telescope wherein two adjustable tubes for adjusting the interocular eyepiece distance are pivotally mounted on a connecting bridge which takes into consideration the special requirements of binocular telescopes fabricated from synthetic materials. In addition, it is desirable to provide a construction which insures axes parallelism of the beam paths within the tolerances required.

SUMMARY OF THE INVENTION

Generally speaking, in accordance with the invention, a pivot-joint construction for a binocular telescope fabricated from a synthetic material is provided. The pivot-joint construction for a binocular telescope includes a tube pivotally mounted on a hinge for adjusting the interocular distance between the eyepieces. The pivot-joint construction provides required friction between the telescope tube and bridge hinge elements by tabs biased along the axis of the hinge. One of the tube and bridge elements includes at least two cooperating elongated hinge tabs having an axial hole therethrough for receiving a hinge pin therein. A compression spring is disposed about the hinge pin in a central hinge tab of one element for producing stress in the axial direction of the hinge between cooperating hinge tabs so that the interocular distances of the telescope remains set without disturbing the axes parallelism of the binocular telescope. The outer cooperating hinge tabs are non-stressed and receive the hinge pin for insuring axes parallelism.

Accordingly, it is an object of the invention to provide an improved binocular telescope.

Another object of the invention is to provide a pivot-hoint construction for a binocular telescope wherein the principal elements are fabricated from a synthetic material.

A further object of the invention is to provide a pivot-joint construction for a binocular telescope fabricated of a synthetic material which provides required friction along the hinge axis without disturbing the axes parallelism of the telescope.

Still another object of the invention is to provide a pivot-joint construction for a binocular telescope fabricated of a synthetic material including a spring for providing necessary friction along the hinge axis.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENT

Figure 1:
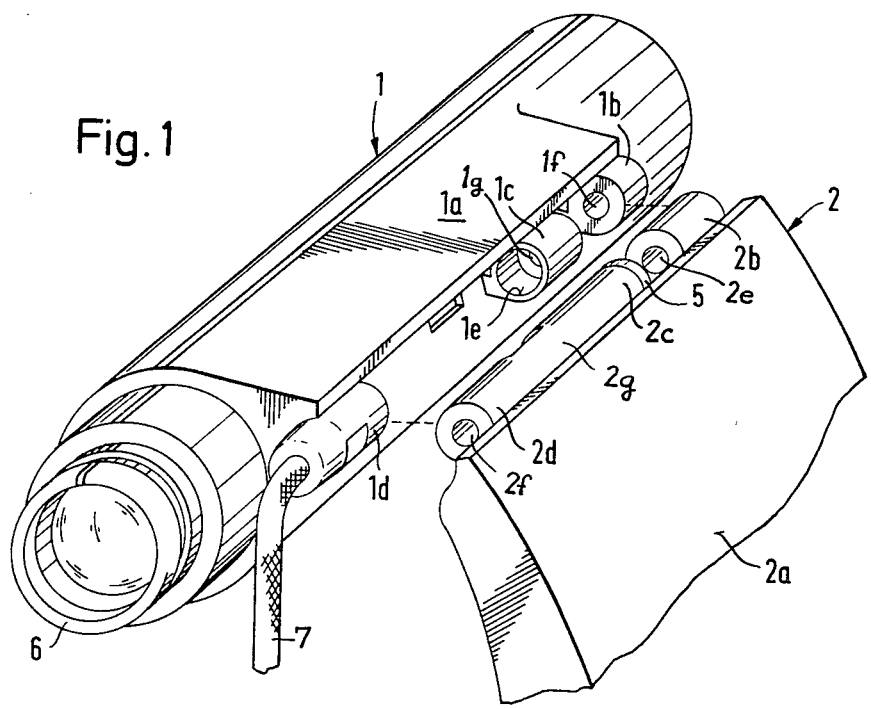
FIG. 1 is an exploded perspective view of a pivot-joint construction for a binocular telescope constructed and arranged in accordance with the invention.

Referring now to FIG. 1, a left telescope tube 1 and a left portion of a bridge 2 for depicting a pivot-joint construction in accordance with the invention is shown in exploded perspective. An eyepiece 6 is disposed within telescope tube 1. The several lenses and prisms present in an assembled binocular telescope have not been illustrated in order to render the drawing clearer for depicting the invention.

The pivot-joint construction includes a tangential flange 1a extending horizontally from the upper portion of tube 1. The upper contour of flange 1a extends into and meets with an upper surface 2a of a connecting bridge 2 of the binocular telescope. Tube 1 includes, in the region below flange 1a, a first forward hinge tab 1b having a blind cylindrical opening 1f therein, a second central hinge tab 1c spaced apart from tab 1b having an opening 1g therethrough and an opening 1e of greater diameter on the rearward surface of tab 1c and a third rearward hinge tab 1d having an opening 1g therethrough.

Figure 2:
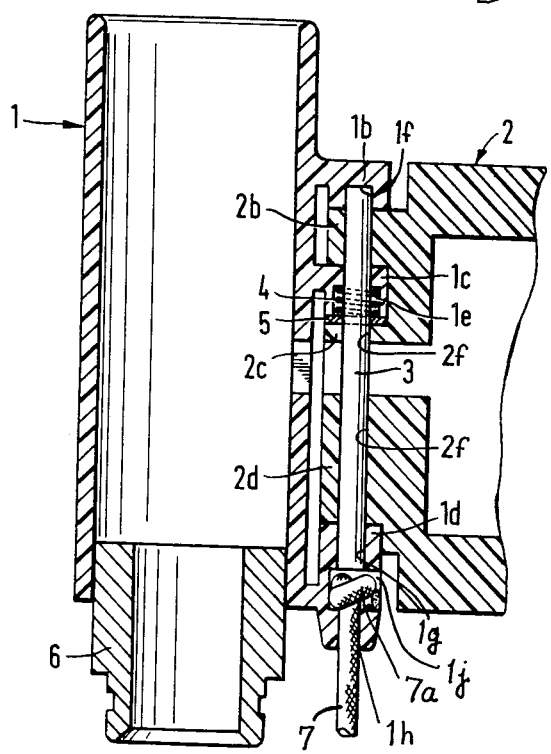
FIG. 2 is a partial sectiona view of an assembled pivot-joint construction as illustrated in FIG. 1.

Collapsible bridge 2 is formed with a first forward hinge tab 2b having an opening 2e therethrough, hinge tab 2b formed to cooperate with and fit between hinge tabs 1b and 1c formed on tube 1 when bridge 2 and tube 1 are assembled as depicted in FIG. 2. Bridge 2 further includes a second rearward elongated hinge tab 2g having a forward section 2c and a rearward section 2d having a cylindrical opening 2f therethrough. Hinge tab 2g is disposed on bridge 2 for cooperating with and fitting between second central hinge tab 1c and third rearward hinge tab 1d formed on tube 1.

When the pivot-joint construction including tube 1 and bridge 2 is assembled as shown in FIG. 2, the cylindrical openings through each of the hinge tabs are aligned essentially parallel to the optical axis of eyepiece 6. A compression spring 4 is inserted in rearward opening 1e in middle tab 1c and a thrust washer 5 sits against the forward end of elongated tab 2d. A single hinge pin 3 passes through the entire length of the pivot joint and seats at the forward end in blind hole 1f of forward tab 1d and passes through thrust washer 5 and compression spring 4 when the pivot-joint is assembled. Pressure from compression spring 4 against thrust washer 5 is transmitted to forward end 2c of elongated tab 2g of collapsible bridge 2. Additionally, the forward end of tube tab 1e is biased against the rearward end of bridge tab 2c. By constructing and arranging hinge tabs and opening in this manner in accordance with the invention, it is assured that the frictional force of compression spring 4 acts in an axial direction parallel to hinge pin 3 and will not affect the geometrical conditions and tolerances imposed upon the telescope. To do otherwise would result in deformation of the axes parallelism between the two eyepieces of the telescope and result in an unacceptable image from the binocular telescope.

When assembling the pivot-joint, the tube 1 and bridge 2 are aligned so that the tabs formed on each member are aligned and hinge pin 3 is inserted through the hinge tabs by an opening 1h formed in the rearward end of rearward tab 1d. Rearward tab 1d is also formed with a side opening 1j for receiving a carrying sling or cord 7 which may be inserted through a side opening 1g and pushed out through rear opening 1h. Cord 7 is maintained in tab 1d by a knot 7a formed at the end thereof which rests fully inserted into side opening 1j. Cord knot 7a also prevents hinge pin 3 from sliding out of engagement with forward tab 1b.

Accordingly, compression spring 4 surrounding hinge pin 3 is supported on its forward end by the wall of enlarged opening 1e in tab 1c which receives spring 4 and the other end lies against thrust washer 5 wich is positioned between tab 1c and the forward end 2c of elongated tab 2g. By constructing and arranging the pivot-joint in this manner, the outer cooperating hinge tabs, namely forward tube tab 1b and forward bridge tab 2b and rear tube hinge 1d and rear end 2d of elongated tab 2g, serve exclusively for maintaining alignment of the optical axis of tube 1 and the optical axis of the other telescope tube and eyepiece (not shown). In this construction these outer hinge portions receive no forces exerted in the direction along the axis defined by hinge pin 3. The friction required is produced solely on the inner hinge tab surrounding compression spring 4. Thus, any forces along the axis on this inner hinged portion results in deformation on a mating surface which will not alter the geometrical relationship between the optical axes of the two telescope eyepieces. Any deformations which will be produced because of the elastic nature of the synthetic material will not transfer to the outer alignment holes which insure parallelism of the cooperative beam paths. The corresponding hinge tabs are dimensioned so that the outer hinge tabs do not impinge for transferring stresses along the axis which may result in possible deformation of telescope tube 1 or bridge 2.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. In a binocular telescope including a pair of optically aligned telescope tubes pivotally mounted on a connecting bridge for adjusting the interocular distance between the tubes, the improvement which comprises a pivot-joint between tube and bridge elements wherein one of said tube and bridge elements is a first element including one central hinge tab with an opening therethrough and a forward hinge tab and a rearward hinge tab spaced apart from said central hinge tab and formed with holes aligned with said opening, said other element is a second element including a forward tab between said forward and central hinge tabs on said first element and a rearward tab between said rearward and central hinge tabs on said first element and formed with holes aligned with said opening, said tabs on said second element engaging said central tab, a hinge pin through the aligned opening and holes of said tabs and means mounted in said central tab for providing friction against said engaging tabs on said second element in the direction of the pin required for maintaining the adjusted interocular distance between the telescope tubes, the surfaces of said forward and rearward hinge tabs on said first element in non-stressed relation with said adjacent hinge tabs on said second element for anchoring said pin and providing alignment between the optical axis of the telescope and said pivot-joint.

2. The binocular telescope of claim 1, wherein said tube and bridge elements are fabricated from synthetic material.

3. The binocular telescope of claim 1 or 2, wherein said means for biasing includes a spring mounted in said central tab and a thrust washer disposed between said spring and one of said tabs on the second element, said spring and washer about said pin.

4. The binocular telescope of claim 3, wherein said thrust washer is disposed between said central tab on said first element and said rearward tab on said second element.

5. The binocular telescope of claim 4, wherein said first element is said telescope tube and said second element is said connecting bridge.

6. The binocular telescope of claim 5, wherein said rearward tab on said bridge is formed with a forward portion in stressed relation with said thrust washer and a rearward portion mating with said rearward tabs of said tube for alignment of said central axis.

7. The binocular telescope of claim 3, wherein the hole in said forward tab of said first element is a blind hole for seating said pin, the hole in the rearward tab is formed therethrough and further including a holding member in said rearward tab for restraining said pin in position.

8. The binocular telescope of claim 7 wherein said holding member is a knot of a carrying sling.

* * * * *